(12) United States Patent
Nakamura et al.

(10) Patent No.: US 11,256,079 B2
(45) Date of Patent: Feb. 22, 2022

(54) SOLID IMMERSION LENS UNIT AND SEMICONDUCTOR DETECTOR DEVICE

(71) Applicant: HAMAMATSU PHOTONICS K.K., Hamamatsu (JP)

(72) Inventors: Tomonori Nakamura, Hamamatsu (JP); Akihiro Nakamura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 111 days.

(21) Appl. No.: 16/469,267

(22) PCT Filed: Nov. 21, 2017

(86) PCT No.: PCT/JP2017/041852
§ 371 (c)(1),
(2) Date: Jun. 13, 2019

(87) PCT Pub. No.: WO2018/110221
PCT Pub. Date: Jun. 21, 2018

(65) Prior Publication Data
US 2019/0391379 A1    Dec. 26, 2019

(30) Foreign Application Priority Data
Dec. 14, 2016 (JP) .............................. JP2016-241976

(51) Int. Cl.
*G02B 21/33* (2006.01)
*G02B 7/02* (2021.01)
*G02B 21/02* (2006.01)

(52) U.S. Cl.
CPC ............. *G02B 21/33* (2013.01); *G02B 7/023* (2013.01); *G02B 21/02* (2013.01)

(58) Field of Classification Search
CPC .... G02B 21/002; G02B 21/02; G02B 21/023; G02B 21/33; G02B 7/023; G02B 7/02;
(Continued)

(56) References Cited

U.S. PATENT DOCUMENTS

2006/0182001 A1    8/2006  Isobe et al.
2015/0260976 A1    9/2015  Frank et al.

FOREIGN PATENT DOCUMENTS

CN    1875306 A    12/2006
CN    105190423 A   12/2015
(Continued)

OTHER PUBLICATIONS

International Preliminary Report on Patentability dated Jun. 27, 2019 for PCT/JP2017/041852.

*Primary Examiner* — Mustak Choudhury
(74) *Attorney, Agent, or Firm* — Faegre Drinker Biddle & Reath LLP (57) ABSTRACT

The solid immersion lens unit includes: a solid immersion lens having a contact surface allowed to be in contact with an inspection object and a spherical surface allowed to be opposite to an objective lens; a holder holding the solid immersion lens; a magnet provided to the holder; and a spherical body rotatably held by a magnetic force of the magnet at a position opposite to the spherical surface. The holder swingably holds the solid immersion lens in a state where the spherical surface is in contact with the spherical body.

10 Claims, 7 Drawing Sheets

(58) Field of Classification Search
CPC ... G02B 7/58; G02B 1/02; G11B 2007/13727
See application file for complete search history.

(56) References Cited

FOREIGN PATENT DOCUMENTS

| | | |
|---|---|---|
| DE | 102005036252 A1 | 2/2007 |
| JP | 2006-228289 A | 8/2006 |
| JP | 2010-281960 A | 12/2010 |
| JP | 2011-164007 A | 8/2011 |
| JP | 2013-105115 A | 5/2013 |
| JP | 2013105115 A * | 5/2013 |
| KR | 10-2016-0131104 A | 11/2016 |
| TW | 201614304 A | 4/2016 |
| WO | WO 2006/077833 A1 | 7/2006 |
| WO | WO-2016/047666 A1 | 3/2016 |
| WO | WO-2016/047667 A1 | 3/2016 |

* cited by examiner

SOLID IMMERSION LENS UNIT AND SEMICONDUCTOR DETECTOR DEVICE

TECHNICAL FIELD

One aspect of the present invention relates to a solid immersion lens unit and a semiconductor inspection apparatus.

BACKGROUND ART

In semiconductor devices, the internal structure has been miniaturized at a level below the wavelength of light. In addition, in the semiconductor devices, the number of wiring layers has been increasing. Therefore, in the case of observing a semiconductor device, observation of the internal structure and the like are performed from a surface of the semiconductor device on the side opposite to a device (integrated circuit or the like) side. At this time, due to constraints according to the band gap of a substrate material of the semiconductor device, shortening the wavelength of light is limited, and as a result, the observable size of the internal structure is also limited.

In some cases, a solid immersion lens (SIL) may be used in order to solve such problems and realize observation of the internal structure at a high resolution. By bringing the contact surface of the solid immersion lens into close contact with the surface of the inspection object to realize evanescent coupling, it is possible to realize observation and the like of the internal structure at a high resolution. For example, Patent Literature 1 discloses an example of swingably holding the solid immersion lens by using an elastic member or an air bearing so that the contact surface of the solid immersion lens can be brought into close contact with the surface of the inspection object even if the surface of the inspection object is inclined.

CITATION LIST

Patent Literature

Patent Literature 1: US Patent Publication No. 2015/0260976

SUMMARY OF INVENTION

Technical Problem

However, in the example disclosed in Patent Literature 1, since the elastic force of the elastic member or the air pressure of the air bearing serves as a resistance, there is a concern that the solid immersion lens does not smoothly swing and the contact surface of the solid immersion lens is not in close contact with the surface of the inspection object.

Therefore, an object of an aspect of the present invention is to provide a solid immersion lens unit capable of easily bringing a contact surface of a solid immersion lens into close contact with a surface of a inspection object and a semiconductor inspection apparatus including such a solid immersion lens unit.

Solution to Problem

According to one aspect of the present invention, there is provided a solid immersion lens unit including: a solid immersion lens having a contact surface allowed to be in contact with an inspection object and a spherical surface allowed to be opposite to an objective lens; a holder holding the solid immersion lens; a magnet provided to the holder; and a spherical body rotatably held by a magnetic force of the magnet at a position opposite to the spherical surface, in which the holder swingably holds the solid immersion lens in a state where the spherical surface is in contact with the spherical body.

In the solid immersion lens unit, the spherical surface of the solid immersion lens is brought into contact with the spherical body rotatably held by a magnetic force of the magnet. Therefore, when the solid immersion lens tends to swing, the spherical body rotates while the spherical surface of the solid immersion lens is in point contact with the surface of the spherical body. Therefore, the solid immersion lens smoothly swings so as to follow the surface of the inspection object. Therefore, according to this solid immersion lens unit, it is possible to easily bring the contact surface of the solid immersion lens into close contact with the surface of the inspection object.

In the solid immersion lens unit according to one aspect of the present invention, the holder may be provided with an accommodation portion accommodating the spherical body. Therefore, it is possible to prevent a situation where the spherical body moves to a place where a magnetic force enough to hold the spherical body is not exerted so that the spherical body falls off.

In the solid immersion lens unit according to one aspect of the present invention, the magnet may be provided to the holder so as to be opposite to a central portion of the accommodation portion. Therefore, it is possible to prevent such a situation that the spherical body interferes with the side face of the accommodation portion when the spherical body starts to move.

In the solid immersion lens unit according to one aspect of the present invention, the spherical body may comprise three or more spherical bodies. Therefore, it is possible to more smoothly swing the solid immersion lens.

In the solid immersion lens unit according to one aspect of the present invention, the holder may be made of a non-magnetic material. Therefore, it is possible to prevent the holding of the spherical body due to the magnetic force of the magnet from becoming unstable due to the magnetic force of the holder.

In the solid immersion lens unit according to one aspect of the present invention, a hardening treatment may be applied to at least a region of the surface of the holder, the region which the spherical body is in contact with. Therefore, it is possible to prevent the surface of the holder from being damaged due to the contact of the spherical body. In addition, it is possible to reduce the frictional force generated between the spherical body and the surface of the holder, so that it is possible to more smoothly swing the solid immersion lens.

The solid immersion lens unit according to one aspect of the present invention may further include a support mechanism movably supporting the holder along a direction intersecting the spherical surface. Therefore, when the contact surface of the solid immersion lens is brought into contact with the surface of the inspection object, it is possible to alleviate the pressure applied to the contact surface of the solid immersion lens.

In the solid immersion lens unit according to one aspect of the present invention, the magnet may have a shape having a spherical surface. Therefore, it is possible to further stabilize the position of the spherical body held by the magnet.

According to one aspect of the present invention, there is provided a semiconductor inspection apparatus including: a stage on which a semiconductor device is mounted, an optical system through which light from the semiconductor device passes, and a photodetector configured to detect the light having passed through the optical system, in which the optical system includes: an objective lens; and the solid immersion lens unit described above.

In the semiconductor inspection apparatus, since the contact surface of the solid immersion lens is easily brought into close contact with the surface of the inspection object, it is possible to detect the semiconductor device with a high accuracy.

Advantageous Effects of Invention

According to one aspect of the present invention, it is possible to provide a solid immersion lens unit capable of easily bringing a contact surface of a solid immersion lens into close contact with a surface of an inspection object and a semiconductor inspection apparatus including such a solid immersion lens unit.

DESCRIPTION OF EMBODIMENTS

Hereinafter, embodiments of the present invention will be described in detail with reference to the drawings. In addition, in each drawing, the same or corresponding components are denoted by the same reference numerals, and duplicate description is omitted.

[Configuration of Semiconductor Detector Device]

Figure 1:
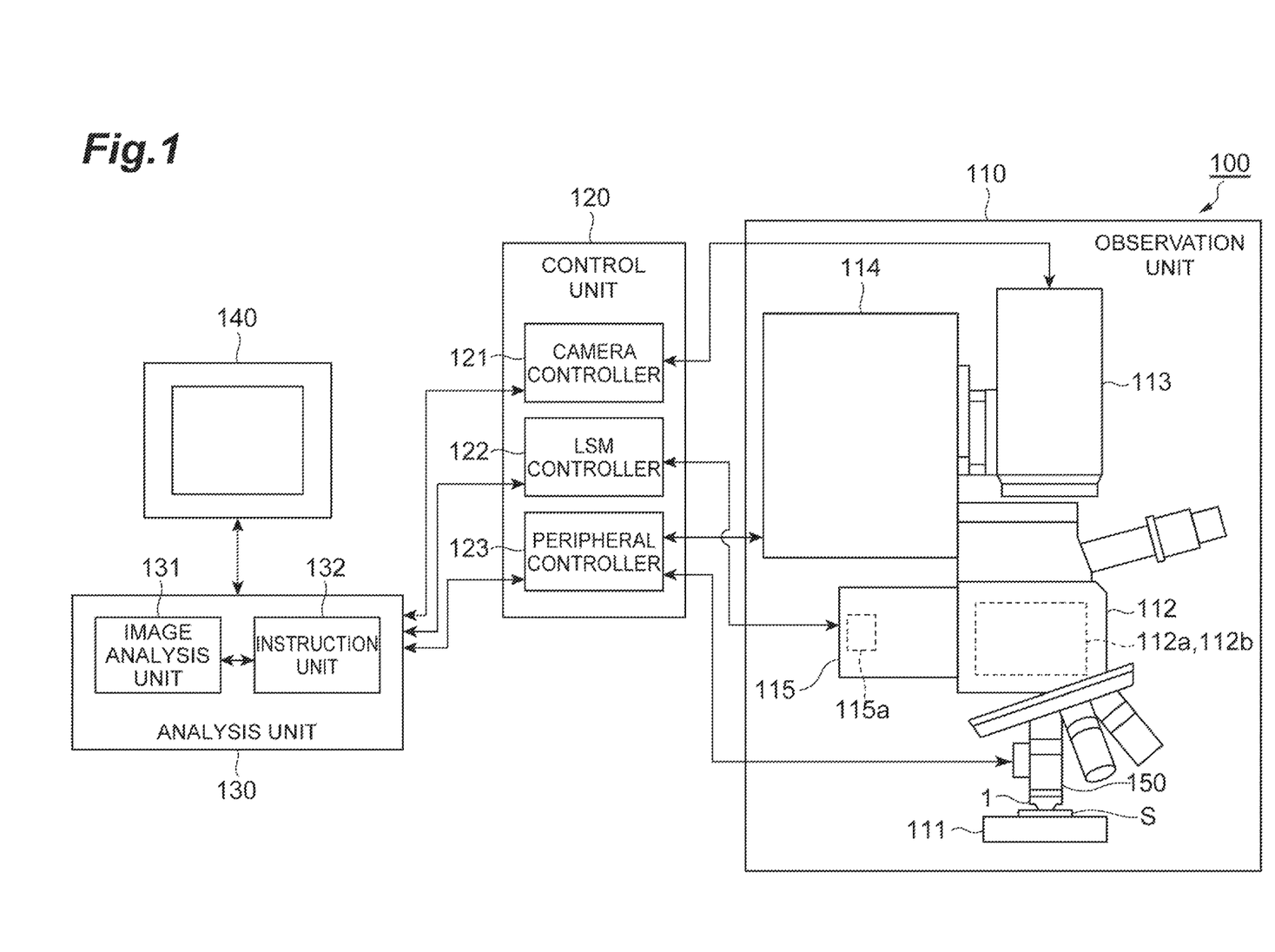
FIG. 1 is a configuration diagram of a semiconductor inspection apparatus according to one embodiment.
Figure 2:
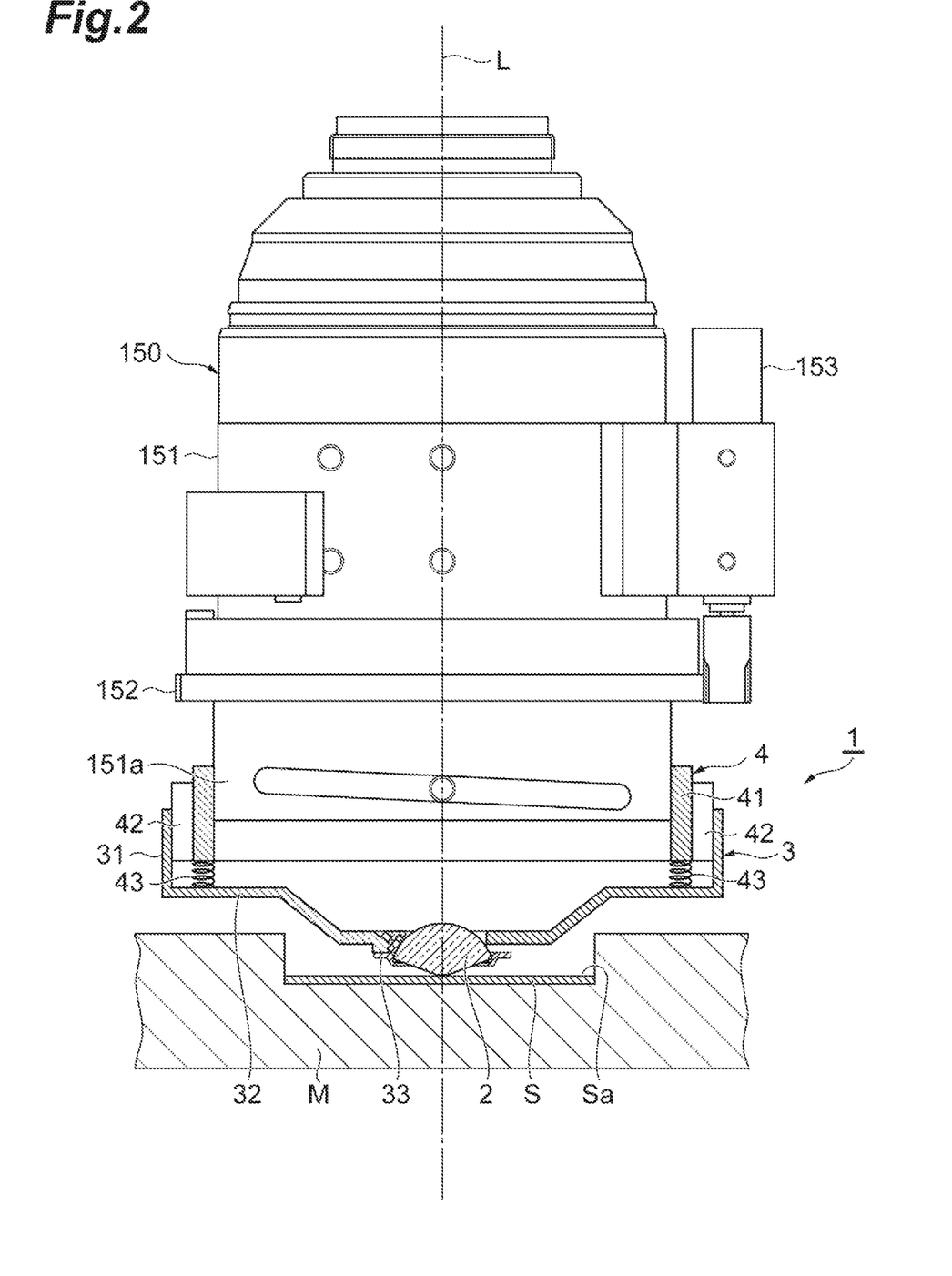
FIG. 2 is a cross-sectional view of a solid immersion lens unit of the semiconductor inspection apparatus illustrated in FIG. 1.

As illustrated in FIG. 1, a semiconductor inspection apparatus 100 is a device that acquires an image of a semiconductor device (inspection object) S and detects internal information of the semiconductor device S. The semiconductor device S is, for example, a discrete semiconductor element (discrete), an optoelectronic element, a sensor/actuator, a logic large scale integration (LSI), a memory element, a linear integrated circuit (IC), or the like, or a hybrid device thereof. The discrete semiconductor element includes a diode, a power transistor, or the like. The logic LSI is configured with a metal-oxide-semiconductor (MOS) structure transistor, a bipolar structure transistor, or the like. In addition, the semiconductor device S may be a package, a composite substrate, or the like including a semiconductor device. The internal information to be detected includes information on a circuit pattern of the semiconductor device S, information on weak light emission from the semiconductor device S (light emission caused by defects of the semiconductor device S, transient light emission accompanying switching operations of transistors in the semiconductor device S, or the like), information on heat generation caused by defects of the semiconductor devices, and the like. As illustrated in FIG. 2, the semiconductor device S is molded with a resin M so that a surface Sa is exposed, and thus, a mold type semiconductor device is configured. The surface Sa is a surface on the side opposite to the device (integrated circuit or the like) side of the semiconductor device S.

As illustrated in FIG. 1, the semiconductor inspection apparatus 100 includes an observation unit 110, a control unit 120, an analysis unit 130, and a display device 140. The observation unit 110 observes the semiconductor device S. The control unit 120 controls the operation of the observation unit 110. The analysis unit 130 performs processes, instructions, and the like necessary for detecting the semiconductor device S. The display device 140 is electrically connected to the analysis unit 130 and displays images, data, and the like acquired or analyzed by the analysis unit 130. The display device 140 is, for example, a display.

The observation unit 110 includes a stage 111, an optical system 112, a two-dimensional camera (photodetector) 113, a movement mechanism 114, and a laser scanning microscope (LSM) unit 115. The semiconductor device S is mounted on the stage 111 in a state where the surface Sa faces the optical system 112 side. The movement mechanism 114 moves the optical system 112, the two-dimensional camera 113, and the LSM unit 115.

The optical system 112 includes a plurality of objective lenses 150, an optical system 112a for a camera, and an optical system 112b for an LSM unit. The magnifications of the objective lenses 150 are different from each other. Each objective lens 150 is allowed to be opposite to the surface Sa of the semiconductor device S mounted on the stage 111. As illustrated in FIG. 2, a correction ring 152 and a correction ring adjusting motor 153 are attached to the objective lens 150. By adjusting the correction ring 152 by driving the correction ring adjusting motor 153, the objective lens 150 can be reliably focused on the site to be observed.

As illustrated in FIG. 1, the optical system 112a for the camera guides the light from the semiconductor device S to the two-dimensional camera 113. The two-dimensional camera 113 detects the light (light passing through the optical system 112) guided by the optical system 112a for the camera. The two-dimensional camera 113 is capable of outputting image data for creating an image such as a circuit pattern of the semiconductor device S. For example, a CCD area image sensor, a CMOS area image sensor, and the like are mounted on the two-dimensional camera 113. The two-dimensional camera 113 may be, for example, an InGaAs camera, an InSb camera, an MCT camera, or the like.

The optical system 112b for the LSM unit guides the laser light emitted from the LSM unit 115 to the semiconductor device S and guides the laser light reflected by the semiconductor device S to the LSM unit 115. The optical system 112b for the LSM unit has an optical scanning unit such as a galvano mirror, a polygon mirror, or an MEMS mirror and scans the semiconductor device S with laser light. The LSM unit 115 emits the laser light generated by the light source and detects the laser light reflected by the semiconductor device S with a photodetector 115a. The light source may generate, for example, continuous wave (CW) light or pulsed light irradiated to the semiconductor device S. The light generated by the light source may be incoherent light as well as coherent light such as laser light. As a light source that outputs coherent light, a solid laser light source, a semiconductor laser light source, or the like can be used. In addition, as a light source that outputs incoherent light, a super luminescent diode (SLD), amplified spontaneous emission (ASE), a light emitting diode (LED), or the like can be used. The photodetector 115a is, for example, an avalanche photodiode, a photodiode, a photomultiplier tube, a superconducting single photon detector, or the like. The intensity of the laser light detected by the photodetector 115a reflects the circuit pattern of the semiconductor device S. Therefore, the photodetector 115a can output the image data for creating the image of the circuit pattern or the like of the semiconductor device S.

The control unit 120 includes a camera controller 121, an LSM controller 122, and a peripheral controller 123. The camera controller 121 is electrically connected to the two-dimensional camera 113. The LSM controller 122 is electrically connected to the LSM unit 115. The camera controller 121 and the LSM controller 122 control execution (observation of images) of observation of the semiconductor device S, setting of observation conditions of the semiconductor device S, and the like by controlling the operations of the two-dimensional camera 113 and the LSM unit 115 respectively.

The peripheral controller 123 is electrically connected to the movement mechanism 114. The peripheral controller 123 controls the movement, position alignment, and the like of the optical system 112, the two-dimensional camera 113, and the LSM unit 115 by controlling the movement of the movement mechanism 114. The peripheral controller 123 is electrically connected to the correction ring adjusting motor 153 (refer to FIG. 2). The peripheral controller 123 controls the adjustment of the correction ring 152 (refer to FIG. 2) by controlling the driving of the correction ring adjusting motor 153.

The analysis unit 130 includes an image analysis unit 131 and an instruction unit 132. The analysis unit 130 is configured with a computer including a processor (CPU), a RAM and a ROM as a recording medium. The analysis unit 130 is electrically connected to each of the camera controller 121, the LSM controller 122, and the peripheral controller 123. The image analysis unit 131 creates an image on the basis of the image data output from each of the camera controller 121 and the LSM controller 122 and executes analysis processing and the like. The instruction unit 132 instructs the control unit 120 to execute the detection of the semiconductor device S in the observation unit 110 with reference to the input content by an operator, the analysis content by the image analysis unit 131, and the like. An operation unit (not illustrated) is electrically connected to the analysis unit 130. A user operates the semiconductor inspection apparatus 100 by operating the operation unit. The operation unit is, for example, a mouse, a keyboard, or the like. In addition, the operation unit may be, for example, a touch panel built in the display device 140.

[Configuration of Solid Immersion Lens Unit]

The optical system 112 further includes a solid immersion lens unit 1 in addition to the above-described objective lens 150 and the like. As illustrated in FIG. 2, the solid immersion lens unit 1 includes a solid immersion lens 2, a holder 3, and a support mechanism 4. In the following description, in a state where the objective lens 150 is opposite to the surface Sa of the semiconductor device S mounted on the stage 111, the side where the objective lens 150 is located with respect to the semiconductor device S is set as an upper side, and the side where the semiconductor device S is located with respect to the objective lens 150 is set as a lower side.

The holder 3 holds the solid immersion lens 2. The holder 3 has a side wall portion 31, a bottom wall portion 32, and a support member 33. The side wall portion 31 has a cylindrical shape. The bottom wall portion 32 is integrally formed with the side wall portion 31 so as to close the opening on the lower side of the side wall portion 31. The support member 33 is attached to the bottom wall portion 32 from the lower side. The side wall portion 31, the bottom wall portion 32, and the support member 33 are made of a non-magnetic material (for example, aluminum, an aluminum alloy, a non-magnetic stainless steel, or the like).

The support mechanism 4 movably supports the holder 3 in a direction parallel to an optical axis L of the objective lens 150. The support mechanism 4 includes an attachment member 41, a plurality of linear guides 42, and a plurality of compression coil springs 43. The attachment member 41 has a cylindrical shape and is attached to a lower end portion 151a of a lens barrel 151 of the objective lens 150. The plurality of linear guides 42 are arranged between the outer face of the attachment member 41 and the inner face of the side wall portion 31 of the holder 3. The plurality of linear guides 42 are arranged at an equal pitch around the optical axis L. The plurality of compression coil springs 43 are arranged between the lower end face of the attachment member 41 and the upper face of the bottom wall portion 32 of the holder 3. The plurality of compression coil springs 43 are arranged at an equal pitch around the optical axis L. Therefore, when an external force is applied to the holder 3 from the lower side, the holder 3 moves upward from the initial position against the biasing force of the plurality of compression coil springs 43, and when the external force is removed from the holder 3, the holder 3 returns to the initial position by the biasing force of the plurality of compression coil springs 43.

Figure 3:
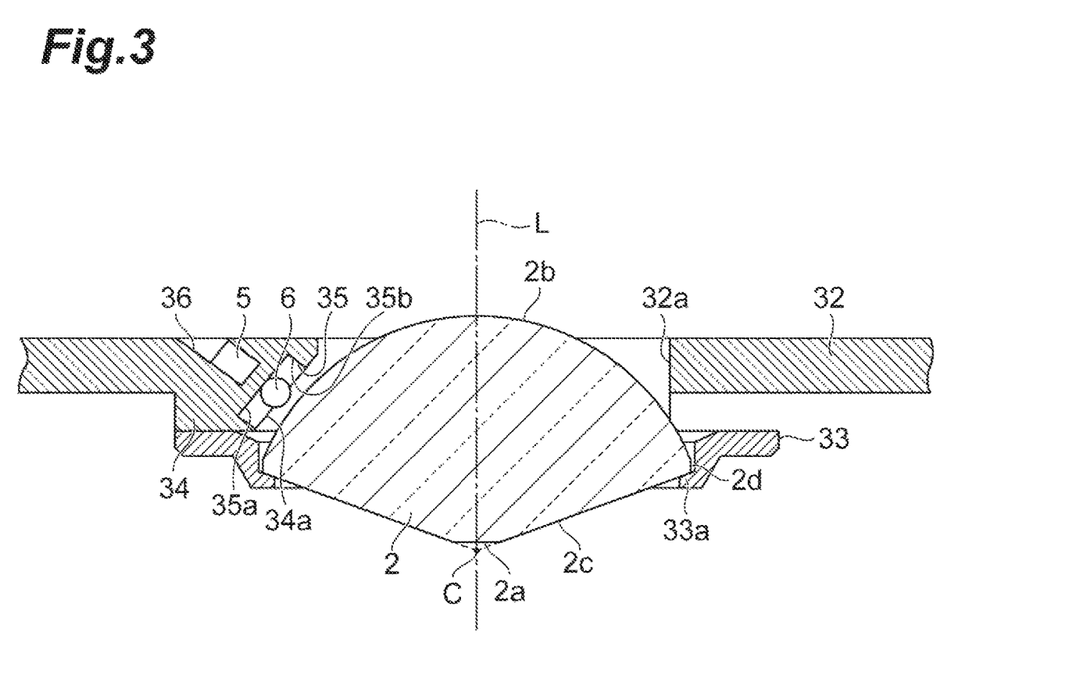
FIG. 3 is a cross-sectional view of a portion of the solid immersion lens unit illustrated in FIG. 2.

As illustrated in FIG. 3, the solid immersion lens 2 has a contact surface 2a, a spherical surface 2b, a tapered face 2c, and a circumferential face 2d. The contact surface 2a is a flat face and is brought into contact with the surface Sa of the semiconductor device S. The spherical surface 2b is a hemispherical surface that is convex to the upper side and is opposite to the objective lens 150. The tapered face 2c is a truncated conical face expanding toward the upper side and extends to the upper side from the outer edge of the contact surface 2a. The circumferential face 2d is a cylindrical face and connects the outer edge of the spherical surface 2b and the outer edge of the tapered face 2c. The apex of the virtual cone including the tapered face 2c coincides with a spherical center C (the center of curvature of the spherical surface 2b) of the solid immersion lens 2 and is located on the optical axis L on the lower side of the contact surface 2a.

The material of the solid immersion lens 2 is substantially the same as the substrate material of the semiconductor device S or a material (for example, Si, GaP, GaAs, or the like) having a refractive index substantially close to the refractive index of the substrate material of the semiconductor device S. The shape of the solid immersion lens 2 is determined by a condition that aberration is substantially eliminated. In the solid immersion lens 2 having the spherical surface 2b, the spherical center C becomes the focal point.

As illustrated in FIG. 2, the solid immersion lens 2 is held by the holder 3 so as to be located on the optical axis L on the lower side (front side) of the objective lens 150. Hereinafter, the holding structure of the solid immersion lens 2 in the holder 3 will be described in more detail.

Figure 4:
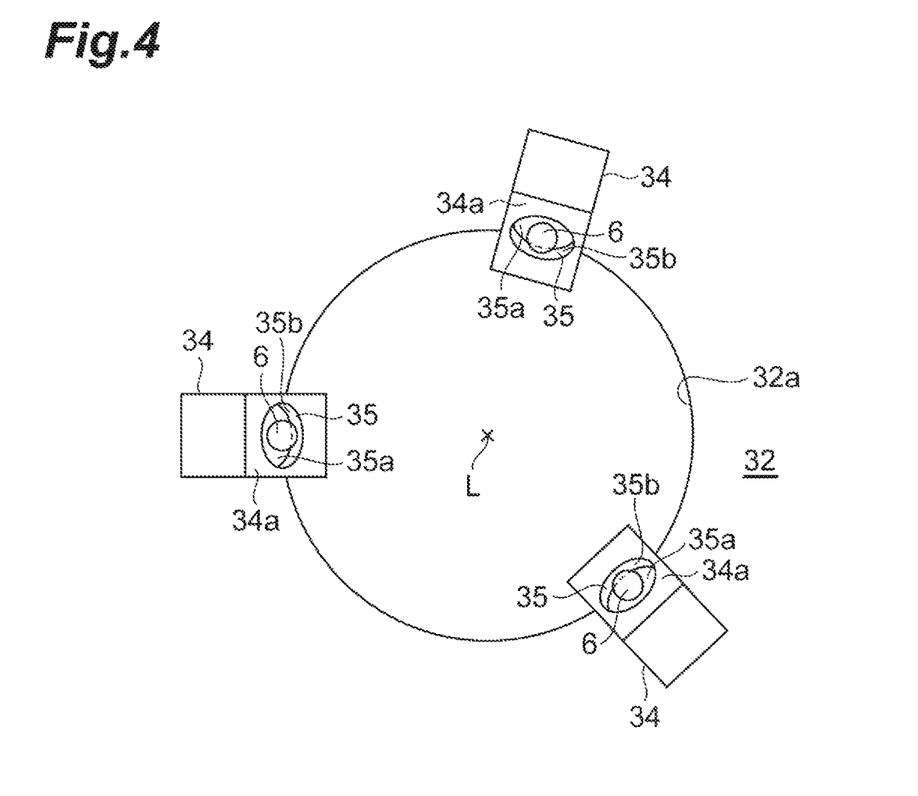
FIG. 4 is a bottom view of a bottom wall portion of a holder of the solid immersion lens unit illustrated in FIG. 2.

As illustrated in FIGS. 3 and 4, an opening 32a is formed in the bottom wall portion 32. The shape of the opening 32a when viewed from a direction parallel to the optical axis L is, for example, a circular shape having the optical axis L as a center line, and the inner diameter of the opening is smaller than the outer diameter of the solid immersion lens 2 (outer diameter of the circumferential face 2d). A plurality of protrusions 34 are provided on the edge portion of the opening 32a. The plurality of protrusions 34 are integrally formed with the bottom wall portion 32 by a non-magnetic material. The plurality of protrusions 34 are arranged at an equal pitch around the optical axis L. In the embodiment, the three protrusions 34 are arranged at a pitch of 120° around the optical axis L.

As illustrated in FIG. 3, the support member 33 has an annular shape and is attached to the bottom wall portion 32 from the lower side, for example, by being screwed to each protrusion 34. The shape of the opening of the support member 33 when viewed from a direction parallel to the optical axis L is, for example, a circular shape having the optical axis L as a center line, and the inner diameter of the opening is slightly larger than the outer diameter of the solid immersion lens 2. An inward flange 33a is integrally formed with the lower end portion of the support member 33. The shape of the opening of the inward flange 33a when viewed from a direction parallel to the optical axis L is, for example, a circular shape having the optical axis L as a center line, and the inner diameter of the opening is smaller than the outer diameter of the solid immersion lens 2.

The solid immersion lens 2 is arranged so that the contact surface 2a protrudes to the lower side from the opening of the inward flange 33a and the circumferential face 2d is located inside the opening of the support member 33. In this state, since the inner diameter of the opening of the support member 33 is slightly larger than the outer diameter of the solid immersion lens 2, the movement of the solid immersion lens 2 in the direction perpendicular to the optical axis L is restricted, and on the other hand, the movement of the solid immersion lens 2 in the direction parallel to the optical axis L and the swing (movement to be inclined by, for example, about 1° with respect to the optical axis L) of the solid immersion lens 2 are permitted. In addition, since the inner diameter of the opening of the inward flange 33a is smaller than the outer diameter of the solid immersion lens 2, falling off of the solid immersion lens 2 to the lower side is prevented.

As illustrated in FIGS. 3 and 4, a plurality of accommodation holes 36 are formed on the upper face of the bottom wall portion 32. The plurality of accommodation holes 36 are arranged so as to correspond to the plurality of protrusions 34, respectively. A magnet 5 is accommodated in each accommodation hole 36. Each magnet 5 has, for example, a cylindrical shape, and the center line of the magnet is directed toward the spherical center C of the solid immersion lens 2. In this manner, the holder 3 is provided with a plurality of the magnets 5.

An inclined surface 34a is formed in each protrusion 34. Each inclined surface 34a is opposite to the spherical surface 2b of the solid immersion lens 2. The accommodation portion 35 is formed on each inclined surface 34a. Each accommodation portion 35 is, for example, a cylindrical recess. The magnet 5 is provided to the holder 3 so as to be opposite to the central portion of the accommodation portion 35. For example, the center line of the accommodation portion 35 coincides with the center line of the magnet 5 accommodated in the corresponding accommodation hole 36. A bottom face 35a of each accommodation portion 35 is a flat face and is opposite to the spherical surface 2b of the solid immersion lens 2. A side face 35b of each accommodation portion 35 has a cylindrical shape. The distance (that is, the height of the side face 35b) between the bottom face 35a and the inclined surface 34a is smaller than the diameter of the spherical body 6. In this manner, the holder 3 is provided with the plurality of accommodation portions 35.

The spherical bodies 6 are accommodated in each accommodation portion 35. Each spherical body 6 is made of a magnetic material (for example, nickel, cobalt, iron, stainless steel, or the like). In each accommodation portion 35, the spherical body 6 is rotatably held at the center (the position opposite to the spherical surface 2b of the solid immersion lens 2) of the bottom face 35a by the magnetic force of the magnet 5 accommodated in the corresponding accommodation hole 36. In this state, a portion of the spherical body 6 protrudes from the accommodation portion 35. In the embodiment, three spherical bodies 6 are arranged at a pitch of 120° around the optical axis L.

As illustrated in FIG. 3, in a state where the outer edge portion of the tapered face 2c of the solid immersion lens 2 is in contact with the inward flange 33a of the support member 33, a gap is formed between the spherical surface 2b of the solid immersion lens 2 and the spherical bodies 6. Therefore, when the solid immersion lens 2 moves to the upper side, the spherical surface 2b of the solid immersion lens 2 is brought into contact with the plurality of spherical bodies 6, so that further movement of the solid immersion lens 2 to the upper side is prevented, and on the other hand, the solid immersion lens 2 is allowed to swing. In this manner, the holder 3 swingably holds the solid immersion lens 2 in a state where the spherical surface 2b of the solid immersion lens 2 is in contact with the plurality of spherical bodies 6.

The inner face (at least the bottom face 35a) of each accommodation portion 35 may be subjected to the hardening treatment. The inner face of each accommodation portion 35 is a region of the surface of the holder 3 which at least the spherical bodies 6 are in contact with. The hardening treatment is a process of allowing the hardness of the surface of the holder 3 (the inner face of each accommodation portion 35 in the embodiment) to be higher than the hardness of the inner portion (the inner portion of each protrusion 34 in the embodiment) of the holder 3. For example, in a case where each protrusion 34 is made of aluminum or an aluminum alloy, alumite treatment can be used as the hardening treatment. For the hardening treatment, it is preferable to select a treatment according to the material constituting each protrusion 34.

[Example of Image Acquisition Method in Semiconductor Detector Device]

As illustrated in FIG. 1, in the semiconductor inspection apparatus 100, the observation portion in the semiconductor device S is identified by the objective lens 150 to which the solid immersion lens unit 1 is not attached. The identification of the observation portion is performed by the instruction to the peripheral controller 123 by the instruction unit 132 and the control of the driving of the movement mechanism 114 by the peripheral controller 123.

Subsequently, the solid immersion lens unit 1 is switched to the objective lens 150 to which the solid immersion lens unit 1 is attached, and the adjustment of the correction ring 152 of the objective lens 150 is performed. The adjustment of the correction ring 152 is performed by the instruction to the peripheral controller 123 by the instruction unit 132 and the control of the driving of the correction ring adjusting motor 153 by the peripheral controller 123. Specifically, the adjustment of the correction ring 152 is performed according to the characteristics (the thickness, the refractive index, or the like of the solid immersion lens 2) of the solid immersion lens 2, the substrate thickness of the semiconductor device S, the substrate material of the semiconductor device S, and the like.

Subsequently, the contact surface 2a (refer to FIG. 3) of the solid immersion lens 2 is brought into close contact with the surface Sa of the semiconductor device S. The close contact of the contact surface 2a of the solid immersion lens 2 is performed by the instruction to the peripheral controller 123 by the instruction unit 132 and the control of the driving of the movement mechanism 114 by the peripheral controller 123.

Subsequently, the focusing of the objective lens 150 to which the solid immersion lens unit 1 is attached is performed. The focusing of the objective lens 150 is performed by the instruction to the peripheral controller 123 by the instruction unit 132 and the control of the driving of the movement mechanism 114 by the peripheral controller 123.

Subsequently, observation of the observation portion in the semiconductor device S is performed. The observation of the observation portion is performed by instructions of the instruction unit 132 to the camera controller 121 and the LSM controller 122, respectively, and the control of the respective operations of the two-dimensional camera 113 and the LSM unit 115.

[Function and Effect]

Figure 5:
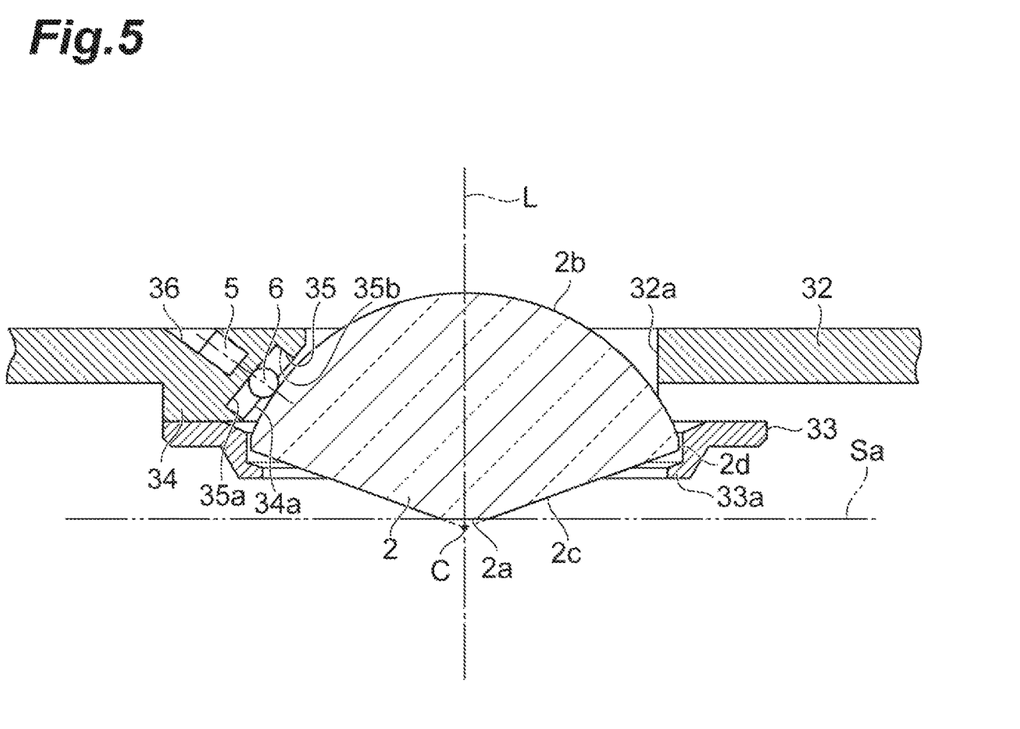
FIG. 5 is a cross-sectional view of a portion of the solid immersion lens unit illustrated in FIG. 2.
Figure 6:
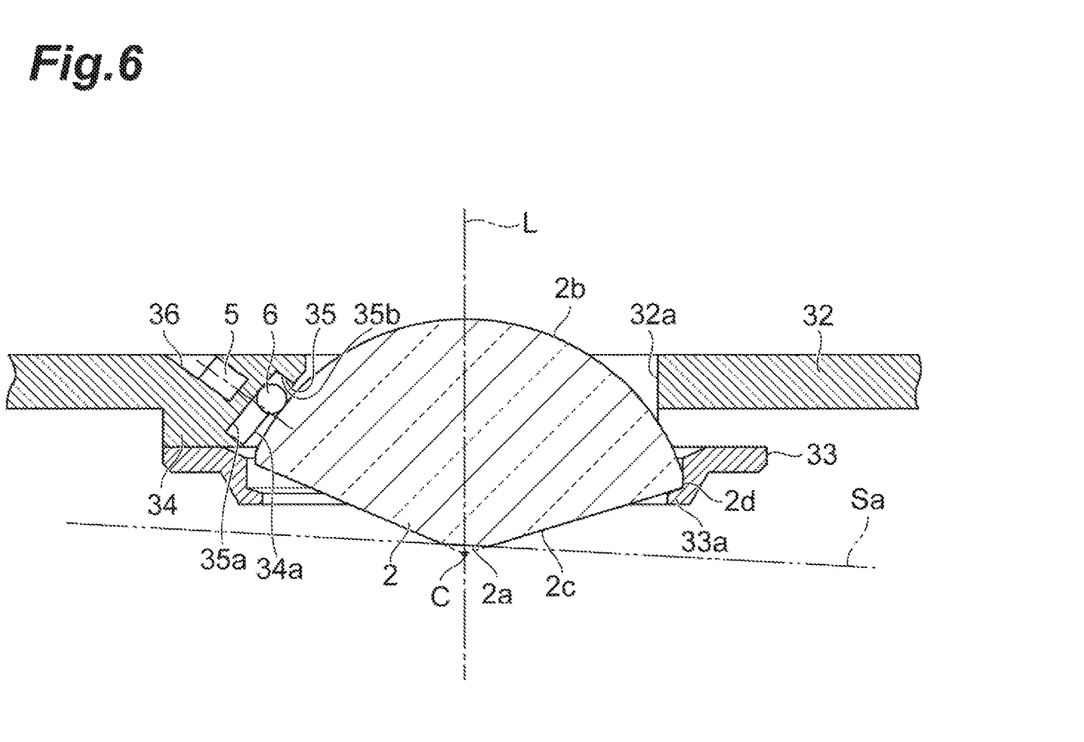
FIG. 6 is a cross-sectional view of a portion of the solid immersion lens unit illustrated in FIG. 2.

As described above, in the solid immersion lens unit 1, as illustrated in FIGS. 5 and 6, when tending to bring the contact surface 2a of the solid immersion lens 2 into close contact with the surface Sa of the semiconductor device S, the solid immersion lens 2 moves to the upper side, and the spherical surface 2b of the solid immersion lens 2 is brought into contact with the plurality of spherical bodies 6 rotatably held by a magnetic force of the plurality of magnets 5. At this time, as illustrated in FIG. 5, if the surface Sa of the semiconductor device S is not inclined with respect to the optical axis L (that is, if the surface is orthogonal), the solid immersion lens 2 hardly swing, but the contact surface 2a of the solid immersion lens 2 is brought into close contact with the surface Sa of the semiconductor device S. On the other hand, as illustrated in FIG. 6, if the surface Sa of the semiconductor device S is inclined with respect to the optical axis L, the solid immersion lens 2 tends to swing so as to follow the surface Sa of the semiconductor device S, and thus, the spherical bodies 6 rotate while the spherical surface 2b of the solid immersion lens 2 is in point contact with the surface of each spherical body 6. Therefore, the solid immersion lens 2 smoothly swings so as to follow the surface Sa of the semiconductor device S. Therefore, according to the solid immersion lens unit 1, it is possible to easily bring the contact surface 2a of the solid immersion lens 2 into close contact with the surface of the semiconductor device S.

In addition, in the solid immersion lens unit 1, the holder 3 is provided with an accommodation portion 35 for accommodating the spherical body 6. Therefore, it is possible to prevent such a situation where the spherical body 6 moves to a place where a magnetic force enough to hold the spherical body is not exerted so that the spherical body 6 falls off.

In addition, in the solid immersion lens unit 1, the magnet 5 is provided to the holder 3 so as to be opposite to the central portion of the accommodation portion 35. Therefore, it is possible to prevent such a situation where the spherical body 6 interferes with the side face 35b of the accommodation portion 35 when the spherical body 6 starts to move.

In addition, the solid immersion lens unit 1 is provided with three spherical bodies 6. Therefore, it is possible to more smoothly swing the solid immersion lens 2.

In addition, in the solid immersion lens unit 1, the holder 3 is made of a non-magnetic material. Therefore, it is possible to prevent the holding of the spherical body 6 due to the magnetic force of the magnet 5 from becoming unstable due to the magnetic force of the holder 3.

In addition, in the solid immersion lens unit 1, the hardening treatment is applied to the inner face (at least the bottom face 35a) of each accommodation portion 35, which is a region of the surface of the holder 3 which at least the spherical bodies 6 are in contact with. Thus, it is possible to prevent the inner face of each accommodation portion 35 from being damaged due to the contact of the spherical bodies 6. In addition, it is possible to reduce the frictional force generated between the spherical body 6 and the inner face of each accommodation portion 35, so that it is possible to more smoothly swing the solid immersion lens 2.

In addition, in the solid immersion lens unit 1, the support mechanism 4 movably supports the holder 3 along a direction (vertical direction in the embodiment) intersecting the spherical surface 2b of the solid immersion lens 2. Therefore, when the contact surface 2a of the solid immersion lens 2 is brought into contact with the surface Sa of the semiconductor device S, it is possible to alleviate the pressure applied to the contact surface 2a of the solid immersion lens 2.

In addition, in the solid immersion lens unit 1, by removing the support member 33, it is possible to perform the replacement of the solid immersion lens 2 and the like. In addition, by removing the attachment member from the lower end portion 151a of the lens barrel 151 of the objective lens 150, it is possible to perform the replacement of the entire solid immersion lens unit 1 and the like.

In addition, as described above, the semiconductor inspection apparatus 100 includes the solid immersion lens unit 1 where the contact surface 2a of the solid immersion lens 2 is easily brought into close contact with the surface Sa of the semiconductor device S. Therefore, according to the semiconductor inspection apparatus 100, it is possible to detect the semiconductor device S with a high accuracy.

[Modified Example]

Although one embodiment of the present invention has been described above, one aspect of the present invention is not limited to the above-described embodiment.

For example, the shape of the solid immersion lens 2 is not limited to a hemispherical shape, and may be, for example, a Weierstrass shape. In addition, a cover made of a magnetic material partially covering the spherical surface 2b may be attached to the spherical surface 2b of the solid immersion lens 2. Therefore, the solid immersion lens 2 around the optical axis L can limit the rotation within a predetermined range.

In addition, the magnet 5 may have a tapered shape toward the position where the spherical body 6 is arranged. In addition, the magnet 5 may be exposed at a position where the spherical body 6 is arranged. In addition, the magnet 5 may not be accommodated in the accommodation hole 36 and may be fixed to the upper face of the bottom wall portion 32 by adhesion or the like, for example.

In addition, the number of spherical bodies 6 is not limited to three, and two or less spherical bodies may be provided, or four or more spherical bodies may be provided. However, if three or more spherical bodies 6 are provided, it is possible to more smoothly swing the solid immersion lens 2 in a more stable state.

In addition, the accommodation portion 35 for accommodating the spherical body 6 is not limited to the recess. For example, a wall portion surrounding the spherical body 6 may be used as the accommodation portion 35. In addition, the region (the bottom face 35a of the accommodation portion 35 in the above-described embodiment) of the holder 3 which the spherical body 6 is in contact with is not limited to a flat face and may have a curved face in a recessed state as long as the curvature is smaller (more gradual) than the spherical surface 2b of the solid immersion lens 2.

In addition, the semiconductor inspection apparatus 100 is not limited to a vertical illumination type apparatus in which the contact surface 2a of the solid immersion lens 2 is brought into contact with the surface Sa of the semiconductor device S from the upper side and may be an inverted type apparatus in which the contact surface 2a of the solid immersion lens 2 is brought into contact with the surface Sa of the semiconductor device S from the lower side. In the inverted type semiconductor inspection apparatus 100, even if the contact surface 2a of the solid immersion lens 2 is not brought into contact with the surface Sa of the semiconductor device S from the lower side, the spherical surface 2b of the solid immersion lens 2 is brought into contact with the spherical body 6. In this case, it is possible to easily bring the contact surface 2a of the solid immersion lens 2 into close contact with the surface of the semiconductor device S.

Figure 7:
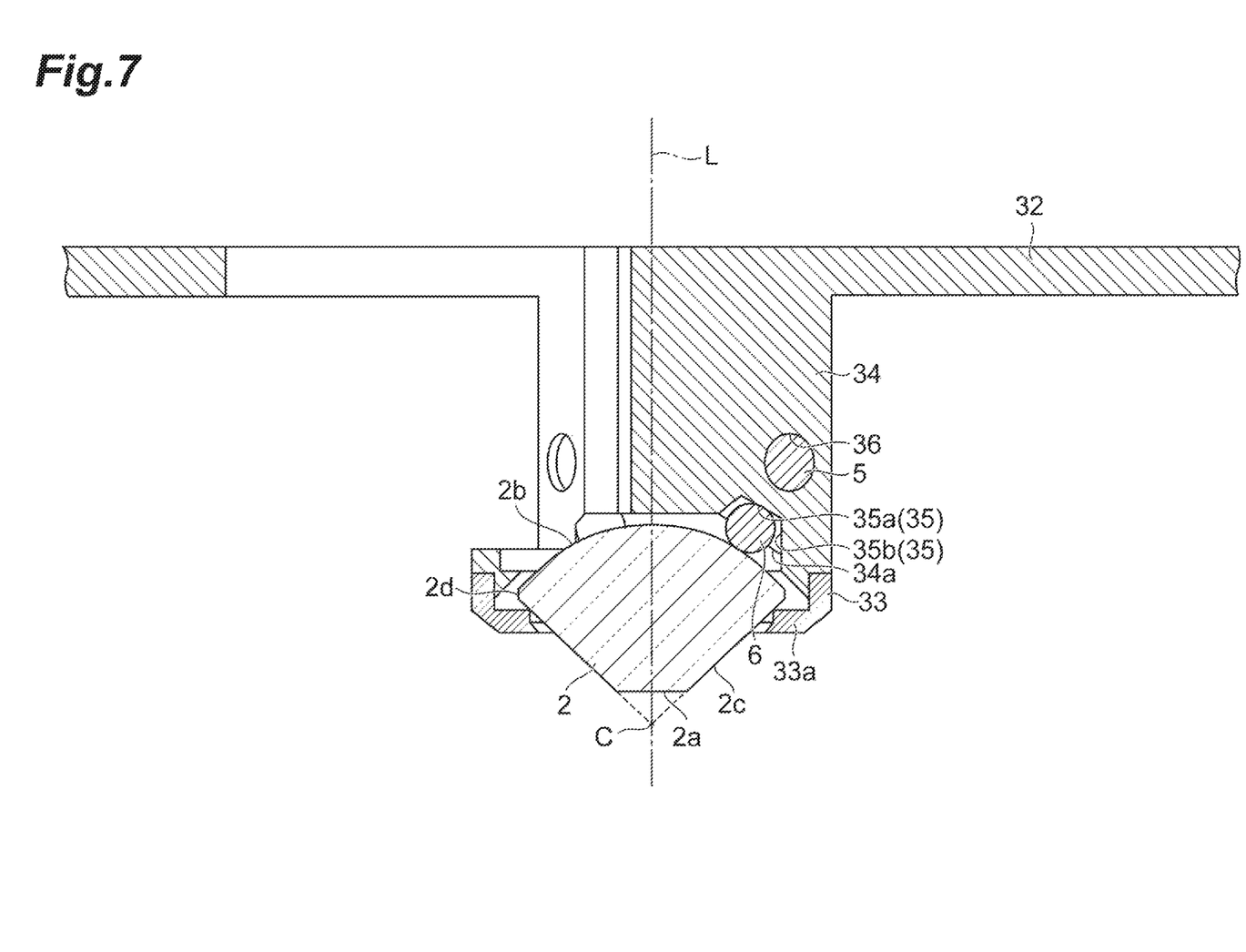
FIG. 7 is a cross-sectional view of a portion of a solid immersion lens unit in a modified example.

In addition, the magnet 5 is not limited to a cylindrical shape and may have a shape having a spherical surface (a curved surface convex to the spherical body 6 side). For example, as illustrated in FIG. 7, the magnet 5 may have a spherical shape. With such a shape, the position of the spherical body 6 held by the magnet 5 can be further stabilized.

REFERENCE SIGNS LIST

1: solid immersion lens unit, 2: solid immersion lens, 2a: contact surface, 2b: spherical surface, 3: holder, 4: support mechanism, 5: magnet, 6: spherical body, 35: accommodation portion, 100: semiconductor inspection apparatus, 111: stage, 112: optical system, 113: two-dimensional camera (photodetector), 150: objective lens, S: semiconductor device (inspection object).

The invention claimed is:

1. A solid immersion lens unit comprising:
a solid immersion lens having a contact surface allowed to be in contact with an inspection object and a spherical surface allowed to be opposite to an objective lens;
a holder holding the solid immersion lens;
a magnet provided to the holder; and
a spherical body held by a magnetic force of the magnet at a position opposite to the spherical surface,
wherein the holder swingably holds the solid immersion lens in a state where the spherical surface is in contact with the spherical body, and
the holder is provided with an accommodation portion accommodating the spherical body.

2. The solid immersion lens unit according to claim 1, wherein the magnet is provided to the holder so as to be opposite to a central portion of the accommodation portion.

3. The solid immersion lens unit according to claim 1, wherein the spherical body comprises three or more spherical bodies.

4. The solid immersion lens unit according to claim 1, wherein the holder is made of a non-magnetic material.

5. The solid immersion lens unit according to claim 1, wherein a hardening treatment is applied to at least a region of the surface of the holder, the region which the spherical body is in contact with.

6. The solid immersion lens unit according to claim 1, further comprising a support mechanism movably supporting the holder along a direction intersecting the spherical surface.

7. The solid immersion lens unit according to claim 1, wherein the magnet has a shape having a spherical surface.

8. A semiconductor inspection apparatus comprising:
a stage on which a semiconductor device is mounted;
an optical system through which light from the semiconductor device passes; and
a photodetector configured to detect the light having passed through the optical system,
wherein the optical system includes:
an objective lens; and
the solid immersion lens unit according to claim 1.

9. A solid immersion lens unit comprising:
a solid immersion lens having a contact surface allowed to be in contact with an inspection object and a spherical surface allowed to be opposite to an objective lens;
a holder holding the solid immersion lens;
a magnet provided to the holder; and
a spherical body held by a magnetic force of the magnet at a position opposite to the spherical surface,
wherein the holder swingably holds the solid immersion lens in a state where the spherical surface is in contact with the spherical body, and
the spherical body comprises three or more spherical bodies.

10. A solid immersion lens unit comprising:
a solid immersion lens having a contact surface allowed to be in contact with an inspection object and a spherical surface allowed to be opposite to an objective lens;
a holder holding the solid immersion lens;
a magnet provided to the holder;
a spherical body held by a magnetic force of the magnet at a position opposite to the spherical surface; and
a support mechanism movably supporting the holder along a direction intersecting the spherical surface,
wherein the holder swingably holds the solid immersion lens in a state where the spherical surface is in contact with the spherical body.

* * * * *